ARRANGEMENT FOR CORRECTING THE GEOMETRY OF THE PICTURE
OF A TELEVISION PICTURE TUBE BY MEANS OF ONE OR MORE
ADJUSTABLY MOUNTED MAGNETS

Filed Dec. 18, 1964 2 Sheets-Sheet 1

INVENTORS
Rudolf Schubert &
Helmut Stenger

BY Spencer & Kaye
ATTORNEYS

Jan. 31, 1967 R. SCHUBERT ETAL 3,302,145

ARRANGEMENT FOR CORRECTING THE GEOMETRY OF THE PICTURE OF A TELEVISION PICTURE TUBE BY MEANS OF ONE OR MORE ADJUSTABLY MOUNTED MAGNETS

Filed Dec. 18, 1964 2 Sheets-Sheet 2

INVENTORS
Rudolf Schubert &
Helmut Stenger
BY Spencer & Kaye
ATTORNEYS

United States Patent Office 3,302,145
Patented Jan. 31, 1967

3,302,145
ARRANGEMENT FOR CORRECTING THE GEOMETRY OF THE PICTURE OF A TELEVISION PICTURE TUBE BY MEANS OF ONE OR MORE ADJUSTABLY MOUNTED MAGNETS

Rudolf Schubert, Ulm-Wiblingen, and Helmut Stenger, Weissenhorn, Germany, assignors to Telefunken Patentverwertungs-G.m.b.H., Ulm/Danube, Germany Filed Dec. 18, 1964, Ser. No. 419,376
Claims priority, application Germany, Dec. 20, 1963, T 25,303
9 Claims. (Cl. 335—212)

The present invention relates to a device for correcting the geometry of television pictures.

There exist television sets whose deflection units are provided with permanent magnets by means of which the geometry of the television picture can be adjusted, this being done by letting the influence which the magnets have on the picture be changed by varying the position of the magnets with respect to the picture tube. To this end, bar magnets are used which are attached to the deflection unit by means of bendable mounts. In other types of arrangements, the geometry of the picture is adjusted by means of cylindrical permanent magnets which are rotatably mounted on the deflection unit and which are magnetized in a direction transverse to the diameter, the magnetic field produced by these magnets being passed on to the space in which the deflection is to act via pole shoes. Yet another type of arrangement which is intended to accomplish the same result involves the provision of rod-shaped or bar-shaped magnets which are magnetized in a preferential direction that is diagonal to the longitudinal axis of the respective magnets, which magnets are mounted, firstly, so as to be displaceable in the direction of the longitudinal axis of the picture tube, by sliding the mounting of the magnets, and secondly, so as to be rotatable about their own axes within the mounting itself.

It is the primary object of the present invention to provide an arrangement which allows improved adjustment of the geometry of the picture of a television tube and, more particularly, to provide a mounting by means of which the magnets can be displaced longitudinally with respect to the picture tube and by means of which the magnets can also be pivoted with respect to the tube.

With the above objects in view, the present invention resides, basically, in an arrangement for correcting the geometry of the picture of a television picture tube by means of an adjustably mounted permanent magnet, which arrangement comprises a deflection unit provided with at least one elongated slot and at least one mounting for securing a permanent magnet to the deflection unit. In accordance with the present invention, the mounting has a main part for holding the permanent magnet and a lug projecting from the main part, this lug having a diameter which, at its smallest, is substantially equal to the width of the slot. The lug has an enlarged free end. The mounting as a whole is arranged on the deflection unit with the lug passing through the slot, thereby allowing the mounting, and with it a permanent magnet held thereby, to be slidably moved with respect to the deflection unit in the direction of the length of the slot and also to be rotated with respect to the deflection unit about the axis of the lug.

Additional objects and advantages of the present invention will become apparent upon consideration of the following description when taken in conjunction with the accompanying drawings in which.

Figure 1:
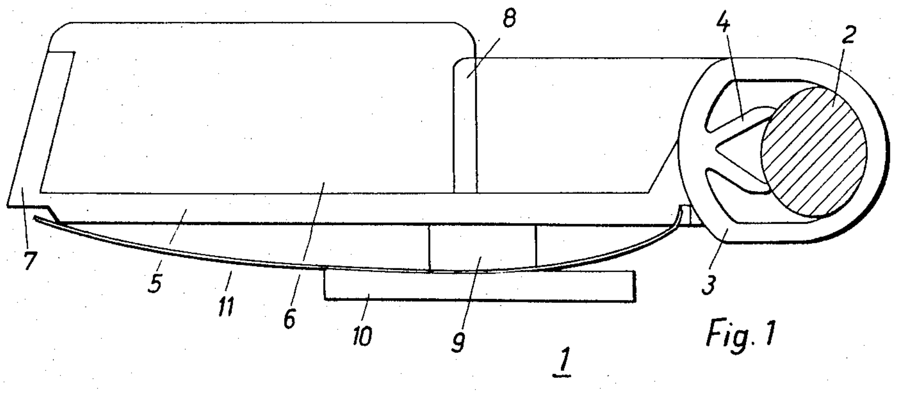
FIGURE 1 is a side elevational view of a mounting in accordance with the present invention.

Referring now to the drawings and first to FIGURE 1 thereof in particular, the same shows a mounting 1, made, for example, of plastic, for mounting the magnet 2 whose magnetic field is used to adjust the geometry of the picture. The magnet 2 is secured in a sleeve 3, the attaching being effected by means of springs 4, as shown in FIGURE 1, thereby suitably wedging or clamping the magnet in place. The sleeve 3 is attached to one end of an arm 5. In practice, the sleeve 3 and arm 5 may be made of one integral piece which can readily be manufactured by an injection molding process. The arm 5 serves as a handle by means of which the position of the magnet 2 is adjusted and may be provided with a longitudinal rib or fin 6 which increases the strength of the part. In order to facilitate gripping of the handle, the same may be provided with transverse ribs 7, 8, as shown, or with calotte-shaped protuberances (not shown).

On the side of the arm 5 opposite to the one where the ribs are provided and at a point spaced from the magnet holding sleeve 3, the arm has a smooth surface and is provided with a round lug 9 which, at its free end (at the bottom, as viewed in FIGURE 1) has a plate-shaped enlargement 10. A leaf spring 11 is interposed between the smooth underside of the arm 5 and the upper surface of the enlargement 10, which leaf spring may be provided for securing a wall section located between the spring and enlargement. If desired, the under surface of the wall section and the upper side of the plate-shaped enlargement 10 may be roughened, riffled or provided with small protuberances, thereby to increase the frictional engagement between the spring and the wall and enlargement.

Figure 2:
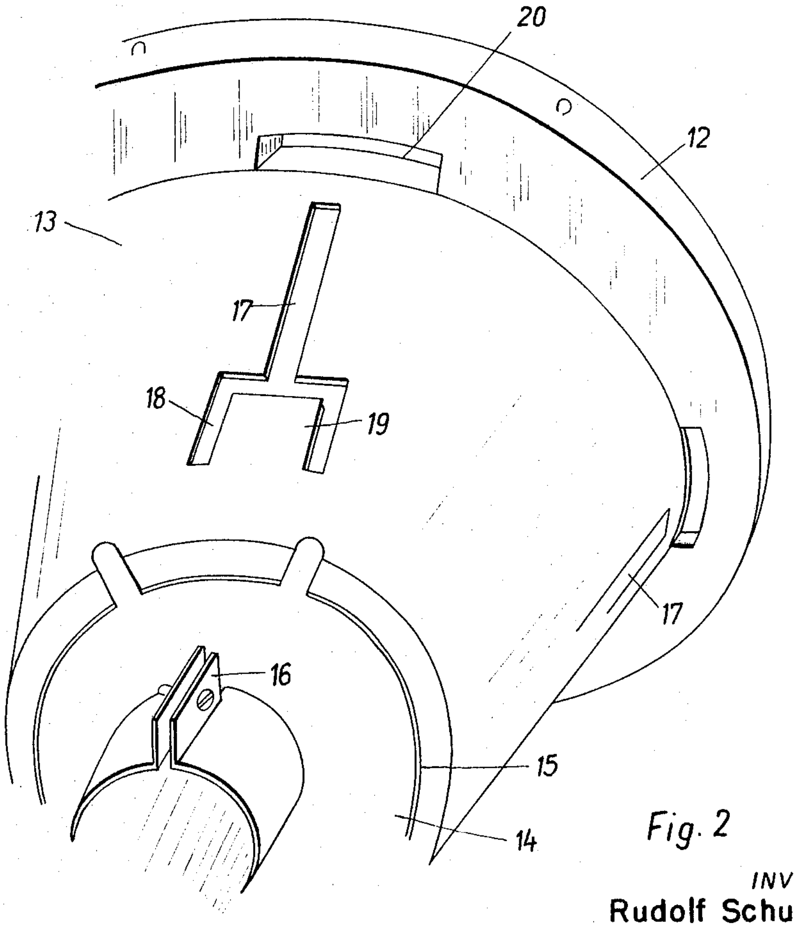
FIGURE 2 is a perspective view of the deflection unit without the mounting.

The above-described mounting 1 is assembled with the deflection unit shown in FIGURE 2, of which only a portion of the periphery is shown, including the front flange 12 which contains the leading end leads of the coils, which have the form of a saddle. The flange 12 and a conical part 13 together form an envelope for the deflection coils, thereby to protect the same, for example, from engagement. The centering magnets 14, 15, and a clamping device 16 are arranged at the rear of the conical part 13. The conical part 13 is provided with a plurality of circumferentially distributed slots 17, of which two are shown in FIGURE 2. Each of these slots will be suited for receiving a respective magnet holder, i.e., a mounting such as is shown per se in FIGURE 1. Each slot 17 has a width which is substantially equal to the diameter of the lug 9 and an enlarged rear portion 18 into which projects a tongue 19. The mounting 1 may be placed on the deflection unit thanks to the provision of the enlarged portion 18 which forms an opening through which the enlargement 10 may pass. The material of which the conical part 13 is made is so selected that the tongue 19, after having been deformed during the insertion, resiliently returns to substantially its original position. The conical part 13 has a thickness equal to or smaller than the length of the above-described lug 9 so that the portions of the conical part 13 which are next to the slot 17 will, while the lug 9 is in the slot 17, be clamped between the upper surface of the enlargement 10 and the spring 11, or, if no spring 11 is provided, between the upper surface of the enlargement 10 and the underside of the arm 5. The flange 12 is provided with openings 20, suitably aligned with the respective slots 17, for receiving the sleeve portions 3 of the respective arms 5.

It will be appreciated that the mounting 1 can be inserted into the conical part 13 by letting the enlargement 10 depress the tongue 19, after which the mounting 1 is pushed forward toward the flange 12 such that the lug 9 slides within the slot 17 and the parts of the conical portion 13 besides the slot 17 are clamped between the enlargement 10 and the spring 11 of the mounting 1, as described above. In practice, the parts are so dimensioned that, if some force is applied, the mounting can readily be pushed in place, but that the mounting will not be displaced with respect to the conical part 13 solely under the influence of such shocks as the tube might be subjected to during shipment.

Figure 3:
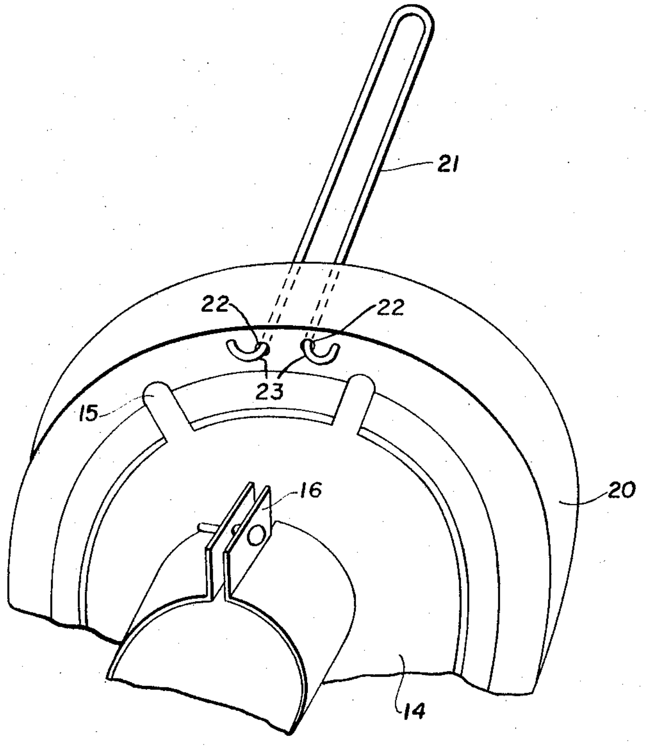
FIGURE 3 is a perspective view of another deflection unit without an envelope for the deflection coils.

If the deflection unit has no envelope provided with a conical portion 13, the slots 17 can be constituted by suitably configured, U-shaped wires 21 according to FIG. 3. The ends 23 of these wires 21 are fastened in a flange 20 by conducting them through holes 22 and crimping them.

After the mounting has been put in place, the tongue 19 blocks and thus prevents the backward movement of the mounting, either by abutting against the lug 9 or against the enlargement 10, to keep the mounting out of a position in which the enlargement 10 is aligned with the recess enlargement 18, so that, unless the tongue 19 is in some manner depressed, the mounting can not be removed from the deflection unit.

The size distortion (height, width) of the picture this being the so-called pin-cushion distortion may be adjusted by moving the mounting 1 in the direction of the axis of the picture tube, while rotating the mounting 1 about the lug 9 effects trapezoidal distortion and antidistortion.

It will be understood that the above description of the present invention is susceptible to various modifications, changes, and adaptations, and the same are intended to be comprehended within the meaning and range of equivalents of the appended claims.

What is claimed is:

1. An arrangement for correcting the geometry of the picture of a television picture tube by means of an adjustably mounted permanent magnet, comprising, in combination:

(a) a deflection unit provided with at least one elongated slot; and (b) at least one mounting for securing a permanent magnet to said deflection unit, said mounting having a main part holding a permanent magnet and a lug projecting from said main part, said lug having a diameter which is substantially equal to the width of said slot, said lug being provided with an enlarged free end; said mounting being arranged on said deflection unit with said lug passing through said slot, thereby to allow said mounting with the permanent magnet held thereby to be slidably moved with respect to said deflection unit in the direction of the length of said slot and also to be rotated with respect to said deflection unit about the axis of said lug; said main part including a clamping portion for receiving the permanent magnet, said lug being spaced from said clamping portion thereby to cause displacement of said clamping portion and the magnet clamped thereby, when said mounting is rotated about said lug axis.

2. An arrangement as defined in claim 1, wherein said enlarged end of said lug is generally plate-shaped.

3. An arrangement as defined in claim 1 further comprising leaf spring means interposed between said enlarged end of said lug and said main part of said mounting, said leaf spring means, when said mounting is on said deflection unit, being between said enlarged end of said lug and said deflection unit.

4. An arrangement for correcting the geometry of the picture of a television picture tube by means of an adjustably mounted permanent magnet, comprising, in combination:

(a) a deflection unit provided with at least one elongated slot; and (b) at least one mounting for securing a permanent magnet to said deflection unit, said mounting having a main part holding a permanent magnet and a lug projecting from said main part, said lug having a diameter which is substantially equal to the width of said slot, said lug being provided with an enlarged free end; said mounting being arranged on said deflection unit with said lug passing through said slot, thereby to allow said mounting with the permanent magnet held thereby to be slidably moved with respect to said deflection unit in the direction of the length of said slot and also to be rotated with respect to said deflection unit about the axis of said lug; said deflection unit, in the region at which it is provided with said slot, having a thickness that is equal to or smaller than the length of said lug.

5. An arrangement as defined in claim 4 wherein one end of said slot is enlarged to form an opening through which said enlarged free end of said lug may pass during placement of said mounting onto said deflection unit.

6. An arrangement as defined in claim 4 wherein said deflection unit is provided with a yieldable tongue that projects into said enlarged end of said slot, which tongue, during placement of said mounting onto said deflection unit, is moved out of the way and, subsequent to such placement, returns to its original position and contitutes an abutment which is engaged by said mounting upon attempted removal thereof from said deflection unit.

7. An arrangement as defined in claim 6 wherein said tongue is arranged to be engaged by said enlarged free end of said lug.

8. An arrangement for correcting the geometry of the picture of a television picture tube by means of adjustably mounted permanent magnets, comprising, in combination:

(a) an annular deflection unit provided with a plurality of circumferentially distributed elongated slots, said slots extending in the direction of the axis of said deflection unit and hence in the direction of a television picture tube with which said deflection unit is associated;

(b) a plurality of permanent magnets; and (c) a plurality of mountings for securing said plurality of permanent magnets to said deflection unit, respectively, each mounting having a main part holding its respective permanent magnet and a lug projecting from said main part, said lug having a diameter which is substantially equal to the width of a respective slot, said lug being provided with an enlarged free end; each mounting being arranged on said deflection unit with the lug of each mounting passing through a respective one of said slots, thereby to allow each mounting, and with it the respective permanent magnet held thereby, to be slidably moved with respect to said deflection unit, in the direction of the respective slot and hence in the direction of the axis of the picture tube, and also rotated with respect to said deflection unit about the axis of the respective lug.

9. An arrangement for correcting the geometry of the picture of a television picture tube by means of an adjustably mounted permanent magnet, comprising, in combination:

(a) a deflection unit provided with at least one wire configured to form an elongated slot; and (b) at least one mounting for securing a permanent magnet to said deflection unit, said mounting having a main part holding a permanent magnet and a lug projecting from said part, said lug having a diameter which is substantially equal to the width of said slot, said lug being provided with an enlarged free end; said mounting being arranged on said deflection unit with said lug passing through said slot, thereby to allow said mounting with the permanent magnet held thereby to be slidably moved with respect to said deflection unit in the direction of the length of said slot and also to be rotated with respect to said deflection unit about the axis of said lug.

References Cited by the Examiner

UNITED STATES PATENTS 2,972,074 2/1961 Vasilevskis ----------- 313—84

BERNARD A. GILHEANY, *Primary Examiner.*

G. HARRIS, Jr., *Assistant Examiner.*